Patented June 19, 1951

2,557,406

UNITED STATES PATENT OFFICE 2,557,406

SOLVENT EXTRACTION AND DEWAXING OF MINERAL OILS

Paul G. Blazer, Arnold M. Leas, and William H. Humphreys, Ashland, Ky., assignors to Ashland Oil and Refining Company, Ashland, Ky., a corporation of Kentucky No Drawing. Application November 12, 1947, Serial No. 785,514

6 Claims. (Cl. 196—14.26)

This invention relates to the separation of wax from mineral oil. It is directed particularly to a method of dewaxing cylinder stocks and the like for the production of lubricating oils which are capable of flowing freely at low temperatures.

The principal objective of the present invention has been to provide a simple process which is capable of effecting substantially complete removal of all wax compounds found in the various types of crude oils, including waxes of a readily crystallizable nature, as well as petrolatum, and amorphous and microcrystalline waxes or ceresins which are evasive and very difficult to remove by the processes now available. A further objective of the present invention has been to provide an effective process of this nature which, for its use, does not require extensive filtering or centrifuging apparatus but which is capable of causing wax precipitation and sedimentation of components in layer formation from which the component layers may be removed conveniently by decantation. The invention also contemplates a method which may be conducted at a rapid rate.

Wax compounds present in mineral oils are in a dissolved or colloidally dispersed state at relatively high temperatures, but become gelatinous or crystalline at very low temperatures. This characteristic has formed the basis of dewaxing processes heretofore employed in which the oil was held at low temperature, with or without a diluent, for a prolonged period of time sufficient for the solid or semi-solid particles of wax to separate by gravity. However, because of the exceedingly fine state of some of the particles, even though of solid condition, and because of the viscous nature and related specific gravity of the oil even when diluted, the fine particles tended to remain as a dispersed phase, and as a result, only a portion of the wax could be separated by such methods.

This invention is predicated upon the concept of providing nuclei in the oil at which crystallization or agglomeration of the various types of waxes may occur when the oil has been reduced to a suitably low temperature, and thereby accelerating the rate of precipitation and sedimentation of the wax components. In some respects the process is believed to be analogous to a crystallization procedure in which seed crystals are employed, although no supercooling or delayed crystallization is encouraged.

More specifically, the process of the present invention contemplates the introduction into the oil of a dewaxing aid which is of a liquid nature at ordinary temperatures, and which crystallizes at a temperature corresponding generally with the crystallization temperature of the wax in the oil. Thus, when the temperature of the oil containing the wax is lowered, conjoint crystallization, precipitation or solidification of the dewaxing aid and wax occurs, crystal masses containing wax grow and become heavy, and sedimentation proceeds in a much more rapid and thorough manner than heretofore has been possible, excepting through the use of elaborate equipment. However, the invention is based upon the further discovery that if refrigeration of the oil is conducted in the presence of a diluent, and if the dewaxing agent is not substantially soluble in either the diluent or the oil, then, as precipitation proceeds, a layer system is produced within a short period of time, the layers respectively comprising one of oil and diluent, another containing the precipitated wax, and usually, still another of dewaxing aid with slight quantities of diluent. Stratification of the system into such layers proceeds rapidly and the layers may be separated sharply one from another by simple decantation. In contrast, the process produces a much more complete removal of the wax than would be obtained by precipitation from a chilled stock containing diluent alone.

In the practice of the process, to facilitate handling and pumping of the oil to be dewaxed, a diluent is added to it, preferably in the form of a normally gaseous liquid hydrocarbon, such as propane, butane, pentane, or the related commercial products which consist of a mixture of such compounds. Such diluents commonly are used in oil refining and dewaxing methods for physico-chemical functions, but in the present process the diluent appears to serve no other purpose at low temperatures than to provide suitable liquidity of the wax-bearing oil. The oil is diluted at a ratio of approximately 2 to 10 parts by volume of diluent of each part of oil, preferably 5 to 1, depending upon the nature of the charge stock and upon the nature of the wax which it contains. The dilution ratio is not of critical importance.

The dewaxing aid or agent need be present in small proportions only, for instance, approximately 2 to 10% by volume based on the total solution, depending upon the crystallizing habits of the dewaxing aid selected for the purpose, the crystallizing habits of the wax, and the degree to which the oil has been diluted. Furfural is disclosed in this specification as a preferred dewaxing aid, though various other compounds have similar characteristics and also may be utilized as, for instance, ethylene dichloride, ethylene glycol, dichlorobenzene, benzaldehyde, and other compounds which are normally liquid organic solvents which are insoluble or substantially insoluble in diluted mineral oil at low temperature and which are capable of crystallizing at temperatures substantially corresponding to the crystallizing temperature of the stock solution being treated. It is to be recognized that the rate of chilling of the stock solution has a bearing upon the temperature at which wax crystals begin to occur; it is desirable in the practice of the present invention that the dewaxing aid display a crystallizing temperature corresponding substantially to the temperature at which wax crystals occur in the stock solution when it is chilled at a high rate. Dewaxing aids of the type disclosed are heavier than oil under ordinary circumstances, and therefore, either free or in conjunction with wax crystals settle from dilute oil solution.

In its simplest aspects, the process is practiced in a closed system adapted to withstand pressures of 250 pounds per square inch or such pressures as are necessary to maintain the diluent in a liquefied condition at the temperature prevailing during mixing. Under suitable pressure, the wax-bearing oil, the diluent and the dewaxing aid are mixed, separately or collectively, to establish uniform distribution of the dewaxing aid in the oil. Next, the oil is rapidly lowered in temperature, sufficiently to cause conjoint crystallization and solidification of the wax and crystallization or solidification of the dewaxing aid, at which time precipitation of particles commences, followed by a growth of particles until they are sufficiently large to settle. Separable, distinct layers will thus form. In the use of furfural, for example, the upper layer will contain diluent and dewaxed oil, a middle layer diluent, wax and furfural, and the bottom layer will consist of furfural and a small percentage of diluent. In ordinary practice, the pumping of the stock solution provides sufficient agitation to facilitate crystal growth; however, the stock solution may be agitated additionally by mechanical means if desired. Intense agitation is to be avoided for fear of disintegrating crystals as they form.

Lowering of the temperature of the oil, as necessary to provide crystallization, conveniently is effected by auto-refrigeration through vaporization of the diluent attending the release of pressure upon it. However, suitable results also may be obtained by refrigeration through heat transfer apparatus.

Various mineral oil stocks and residuums respond satisfactorily to the treatment just described, including wax-bearing light or heavy lubricating fractions or blends derived from asphaltic mixed base or paraffin base crudes; heavy stock advantageously settles rapidly. It is particularly useful in respect to the dewaxing of cylinder stocks from which asphalt previously has been removed as by vacuum distillation, or by means of propane treatment. Inasmuch as the dewaxing temperature is low, and inasmuch as the amount of dewaxing aid is very small in relation to the oil and to the diluent, aromatic compounds present in the oil are not selectively absorbed by the dewaxing aid, as might otherwise be the case at higher temperatures.

Upon stratification of the components of the system following crystallization, the layers readily may be removed by decantation, either continuously or batchwise. Of the upper layer, the diluent is stripped from the oil for reuse, yielding the dewaxed oil. The bottom layer, consisting predominantly of dewaxing aid and only a small proportion of diluent may be recycled to an earlier stage of the process for use as dewaxing aid. The middle layer consisting essentially of wax and dewaxing aid, but also containing some diluent and oil, is removed and passed to a stripping column at which the dewaxing aid and diluent are removed for recovery, leaving the final wax product containing some oil. On the other hand, to produce a deoiled wax or to recover oil present in the wax layer, the two lower layers and some additional diluent may be passed, in admixture, to a second stage of auto-refrigeration at which further precipitation of the wax is carried on. Oil and diluent separated in the second stage may be recycled to the first stage while the wax and dewaxing aid may be removed for separate recovery of the dewaxing aid from the wax.

Inasmuch as some selective solvents of the type commonly employed in mineral oil solvent refining methods display the properties of the dewaxing agents used in the practice of this invention, the present method conveniently may be carried on as an adjunct to the solvent refining of lubricating oils, followed by dewaxing. Thus, propane and furfural commonly are used in combination for solvent refining purposes, and therefore, if desirable, solvent refining operations may be carried on such that after one or two solvent refining extractions the oil, still bearing wax but refined as to naphthenes and aromatic compounds, also contains sufficient furfural to facilitate crystallization of the wax at low temperature. To conduct this process, the oil is mixed at an elevated temperature of, for instance, approximately 185° F. with diluent and with a selective solvent having dewaxing functions, the ratio of diluent to oil being, for example, 3 to 1, more or less depending on the nature of the charge stock, and the ratio of solvent to oil being 3 to 7, to 1. After mixing, the composition is permitted to separate into layers consisting respectively of an extract containing a major portion of solvent, undesirable constituents and aromatic compounds originally present in the oil, and a small portion of diluent, while the raffinate layer contains a small portion of the solvent and the balance of the oil and diluent. The extract layer is removed to a solvent recovery system where the solvent and diluent are stripped for recycling, while the raffinate layer is removed, preferably to a second extraction stage. Two extraction stages of the type just described produce a refined oil of good quality, but if desired, additional stages may be employed.

Following the last extraction, the raffinate is subjected to the dewaxing process in accordance with the present invention. In conducting a solvent refining operation of the type just described, it will be noted that selective solvent-dewaxing aid originally was present in the oil in a quantity far in excess of that necessary or desirable for wax separation. However, in a solvent refining process the major portion of the selective solvent follows the extract. Thus, at the end of the second or last stage of extraction, the raffinate phase contains a substantial portion of diluent but only a small portion of selective solvent-dewaxing aid. This portion, however, is usually sufficient to enable the latter component to serve its function as a dewaxing aid when the last stage raffinate is refrigerated to dewaxing temperature, the exact amount depending on the temperature at which refining is conducted. If multiple extractions have reduced the quantity of dewaxing aid in the raffinate too much, then additional dewaxing aid may be introduced before refrigeration.

The following example illustrates one typical method of practicing the process for dewaxing and solvent refining of raw lubricating oil charge stock.

Western Kentucky (Owensboro field) cylinder stock having a viscosity of 210 S. U. of 90 seconds is pumped through a mixing pipe column with propane and furfural in the following approximate ratios, by volume: 1 part cylinder stock; 1 part propane-propylene (commercial propane); 6 parts furfural (commercial grade). The temperature is adjusted to approximately 185° F. by passing the flowing mixture through a steam-jacketed pipe. Following mixing, the oil-propane-furfural mixture is allowed to settle in a pressure drum for about one hour, after which partially solvent refined oil-propane mixture is removed as raffinate by decanting the top layer from the settling receptacle. The partially refined oil is subjected to a second extraction with the addition of fresh propane and furfural to obtain approximately the following ratios, by volume: 1.8 parts partially solvent refined oil; 11 parts propane; 11 parts furfural. This mixture is again contacted in a mixer at about 180° F. and is allowed to settle for a period of approximately one hour in a pressure receptacle. Throughout both extractions sufficient pressure is maintained to keep the mixture in the liquid phase. After the second extraction, the raffinate is displaced into a dewaxing vessel at which pressure is released from approximately 200 pounds to zero pounds in about one hour. By this auto-refrigeration, the temperature is decreased to approximately −40° F. Make-up liquid propane may be added to compensate for propane lost as vapor during auto-refrigeration.

The temperature of the mixture is maintained at approximately −40° F. for about one hour, during which time wax-furfural crystals settle toward the bottom of the vessel. While still maintaining the low temperature, the top layer of dewaxed oil and propane is decanted through tricock lines, the wax-furfural crystal layer is removed from the vessel as a middle layer, and the bottom layer consisting essentially of free furfural is withdrawn from the bottom.

The top layer consists of approximately 75% propane, the balance being essentially a dewaxed oil. The propane and any furfural that is present in the oil may be removed by heating in a vacuum still. The middle wax-bearing layer contains approximately 25% of propane and about equal parts of wax and furfural in admixture, and from this layer the propane and furfural can be removed by stripping to leave the final wax product in a suitable condition. The bottom layer, in addition to furfural, will contain approximately 2% of propane.

For solvent refining purposes, the furfural extract layer in both refining stages may be removed from the contacting vessel and combined in a still at which propane may first be stripped, after which the furfural is recovered as distilled overhead, leaving the naphthenic extract as a residue.

The following yield data is informative as to treatment of Owensboro 90 viscosity cylinder stock in a process as described.

|  | Original Sample | Two-Stage Solvent Refined |
|---|---|---|
| *Tests* | | |
| Gravity | 22.0 | 28.6 |
| Vis. Gravity Constant | 0.850 | 0.810 |
| Flash | 495 | 515 |
| Fire | 570 | 575 |
| Pour | +90 | +15 |
| Vis. at 210 | 90.4 | 73.9 |
| Vis. at 130 | 525 | |
| Vis. at 100 | 1,681 | 736 |
| V. I. at 100 | 45 | 91.2 |
| V. I. at 130 | 70 | |
| Color (95/5) | 2½ | |
| Color (NPA) | | 4-4½ |
| Con. Carbon | 1.64 | 0.24 |
| *Yields* | | |
| Dewaxed Oil | | 52.5 |
| Wax and Foots Oil | | 24.6 |
| Extract | | 22.9 |
| Pour+0.3 Paraflow | | +5 |
| Pour+0.5 Paraflow | | 0 |

The mechanism of crystal formation displayed in the practice of the present invention is not fully understood by the evidence which is available at present. As the temperature is decreased, the solubility of the diluent in the dewaxing aid is decreased, and a substantial portion of the latter settles to the bottom of the vessel. However, at temperatures at or below the freezing point of the dewaxing aid and wax, large flocculent crystals are formed in the solution and it is believed that these consist primarily of crystal nuclei of the dewaxing aid to which masses of finer crystals of solid or semi-solid wax have become attached. At any rate, the specific gravity of the agglomerations is such that a rapid settling of the wax-bearing layer is effected. If the crude stock consisted originally of light and heavy lubricating oil fractions, the separation of crystalline and microcrystalline waxes may be effected by fractionation after the wax layer has been removed from the settling tank. The recovered wax also may be processed by acid-treating or by contact with clay.

Having described our invention, we claim:

1. The method of separating wax from a wax-bearing petroleum oil which method comprises, mixing the oil with a normally gaseous liquefied hydrocarbon diluent and with about 2 to 10% by volume of furfural, chilling the mixture to a low temperature which is below the solidification temperature of wax bodies in the oil and which is also below the freezing point of the furfural in the mixture, thereby inducing incipient crystallization of wax of the mixture in an environment of incipient foci crystals of furfural, then causing the mixture to stratify into three separable layers, the upper one being essentially dewaxed oil in solution in said diluent, the bottom layer consisting predominantly of furfural, and the middle layer consisting essentially of a suspension of crystallized wax and crystallized furfural in liquefied diluent, and separating the dewaxed oil layer from the other two by decantation.

2. The method of separating wax from a wax-bearing petroleum oil which method comprises, mixing the oil with a normally gaseous liquefied hydrocarbon diluent and with about 2 to 10% by volume of furfural, chilling the mixture to a low temperature which is below the solidification temperature of wax bodies in the oil and which is also below the freezing point of the furfural in the mixture, thereby inducing incipient crystallization of wax of the mixture in an environment of incipient foci crystals of furfural, then causing the mixture to stratify into three separable layers, the upper one being essentially dewaxed oil in solution in said diluent, the bottom layer consisting predominantly of furfural, and the middle layer consisting essentially of a suspension of crystallized wax and crystallized furfural in liquefied diluent, and separately decanting the respective upper layer containing dewaxed oil and the middle layer containing wax from the bottom layer.

3. The method of separating wax from a wax-bearing petroleum oil which method comprises, mixing the oil with a normally gaseous liquefied hydrocarbon diluent and a small quantity of furfural, chilling the mixture to a low temperature which is below the solidification temperature of wax bodies in the oil and which is also below the freezing point of the furfural in the mixture, thereby inducing incipient crystallization of wax of the mixture in an environment of incipient foci crystals of furfural, then causing the mixture to stratify into three separable layers, the upper one being essentially dewaxed oil in solution in said diluent, the bottom layer consisting predominantly of furfural, and the middle layer consisting essentially of a suspension of crystallized wax and crystallized furfural in liquefied diluent, separately decanting the layers respectively containing dewaxed oil and diluent, and wax and furfural, and separately removing the diluent and furfural from said layers.

4. The method of treating a wax-bearing petroleum oil to produce a refined, wax-free oil from it, which method comprises, extracting the oil at elevated temperature with furfural in the presence of a liquefied normally gaseous hydrocarbon diluent, and thereby producing a raffinate containing refined oil, diluent, and a small quantity of furfural, then chilling the raffinate to a low temperature which is below the solidification temperature of wax in the raffinate, and which is also below the freezing point of furfural in the raffinate, thereby inducing incipient crystallization of wax in an environment of foci crystals of furfural, causing the chilled mixture to stratify into three separable layers, the upper one being essentially dewaxed oil and diluent, the middle one consisting essentially of a suspension of wax and crystallized furfural in liquefied diluent, and the bottom one consisting predominantly of furfural, and separating the dewaxed oil layer from the others by decantation.

5. The method of treating a wax-bearing petroleum oil to produce a refined, wax-free oil from it, which method comprises, extracting the oil at elevated temperature with furfural in the presence of a liquefied normally gaseous hydrocarbon diluent, and thereby producing a raffinate containing refined oil, diluent, and a small quantity of furfural, then chilling the raffinate over a period not exceeding substantially one hour to a low temperature which is below the solidification temperature of wax in the raffinate, and which is also below the freezing point of furfural in the raffinate, thereby inducing incipient crystallization of wax in an environment of foci crystals of furfural, causing the chilled mixture to stratify into three separable layers, the upper one being essentially dewaxed oil and diluent, the middle one consisting essentially of a suspension of wax and crystallized furfural in liquefied diluent, and the bottom one consisting predominantly of furfural, and separating the dewaxed oil layer from the others by decantation.

6. The method of separating wax from a wax-bearing petroleum oil which method comprises, mixing the oil with a normally gaseous liquefied hydrocarbon diluent and with about 2 to 10% by volume, of furfural, chilling the mixture to a low temperature which is below the solidification temperature of wax bodies in the oil and which is also below the freezing point of the furfural in the mixture, thereby inducing incipient crystallization of wax of the mixture in an environment of incipient foci crystals of furfural, then causing the mixture to stratify into three separable layers, the upper one being essentially dewaxed oil in solution in said diluent, the bottom layer consisting predominantly of furfural, and the middle layer consisting essentially of a suspension of crystallized wax and crystallized furfural in liquefied diluent, removing the dewaxed oil layer by decantation, and removing the bottom layer before it freezes to the point of immobility.

PAUL G. BLAZER.
ARNOLD M. LEAS.
WILLIAM H. HUMPHREYS.

REFERENCES CITED

The following references are of record in the file of this patent:

UNITED STATES PATENTS

| Number | Name | Date |
|---|---|---|
| 1,779,287 | Pfaff et al. | Oct. 21, 1930 |
| 1,820,645 | Bennett | Aug. 25, 1931 |
| 2,017,432 | Bahlke | Oct. 15, 1935 |
| 2,085,519 | Verver | June 29, 1937 |
| 2,114,467 | Fulton et al. | Apr. 19, 1938 |